United States Patent
Han et al.

(10) Patent No.: US 10,044,582 B2
(45) Date of Patent: Aug. 7, 2018

(54) GENERATING SECURE NAME RECORDS

(75) Inventors: Liang Han, Pleasanton, CA (US); Yang Yang, San Jose, CA (US)

(73) Assignee: A10 NETWORKS, INC., San Jose, CA (US)

( * ) Notice: Subject to any disclaimer, the term of this patent is extended or adjusted under 35 U.S.C. 154(b) by 138 days.

(21) Appl. No.: 13/360,697

(22) Filed: Jan. 28, 2012

(65) Prior Publication Data
US 2013/0198385 A1     Aug. 1, 2013

(51) Int. Cl.
| | |
|---|---|
| G06F 15/173 | (2006.01) |
| H04L 12/26 | (2006.01) |
| H04L 29/12 | (2006.01) |
| H04L 12/24 | (2006.01) |
| H04L 12/64 | (2006.01) |

(52) U.S. Cl.
CPC ...... *H04L 43/0817* (2013.01); *H04L 12/6418* (2013.01); *H04L 29/12066* (2013.01); *H04L 29/12594* (2013.01); *H04L 41/5058* (2013.01); *H04L 61/1511* (2013.01); *H04L 61/302* (2013.01); *H04L 61/609* (2013.01)

(58) Field of Classification Search
CPC ......... H04L 29/12066; H04L 29/12594; H04L 61/302; H04L 61/1511
USPC ........................................................ 709/226
See application file for complete search history.

(56) References Cited

U.S. PATENT DOCUMENTS

| | | |
|---|---|---|
| 4,001,819 A | 1/1977 | Wise |
| 5,101,402 A | 3/1992 | Chiu et al. |
| 5,163,088 A | 11/1992 | LoCascio |
| 5,218,602 A | 6/1993 | Grant et al. |
| 5,359,659 A | 10/1994 | Rosenthal |

(Continued)

FOREIGN PATENT DOCUMENTS

| | | |
|---|---|---|
| CN | 1372662 A | 10/2002 |
| CN | 1422468 A | 6/2003 |

(Continued)

OTHER PUBLICATIONS

Spatscheck et al., "Optimizing TCP Forwarder Performance", IEEE/ACM Transactions on Networking, vol. 8, No. 2, Apr. 2000.

(Continued)

*Primary Examiner* — Philip Chea
*Assistant Examiner* — Mohammed Ahmed
(74) *Attorney, Agent, or Firm* — AMPACC Law Group, LLP; Keith Kline (57) ABSTRACT

A method to generate name records by a service gateway includes: receiving a name service request including a name from a host; creating a name service request using the name; sending the name service request to a name service server; receiving a response from the name service server, the response including a service server name record with one or more service server name entries corresponding to the name; generating and storing service gateway name records using the name and the name entries; and sending a selected service gateway name record to the host as a response to the name service request. When a subsequent name service request including the name is received, the service gateway compares the name against the stored service gateway name records, and in response to finding a match, sending the given service gateway name record as a response to the subsequent name service request.

28 Claims, 5 Drawing Sheets

(56) References Cited

U.S. PATENT DOCUMENTS

| | | | |
|---|---|---|---|
| 5,414,833 | A | 5/1995 | Hershey et al. |
| 5,684,875 | A | 11/1997 | Ellenberger |
| 5,774,660 | A | 6/1998 | Brendel et al. |
| 5,935,207 | A | 8/1999 | Logue et al. |
| 5,940,002 | A | 8/1999 | Finn et al. |
| 5,958,053 | A | 9/1999 | Denker |
| 5,960,177 | A | 9/1999 | Tanno |
| 5,995,981 | A | 11/1999 | Wikstrom |
| 6,003,069 | A | 12/1999 | Cavill |
| 6,047,268 | A | 4/2000 | Bartoli et al. |
| 6,088,804 | A | 7/2000 | Hill et al. |
| 6,119,236 | A | 9/2000 | Shipley |
| 6,131,163 | A | 10/2000 | Wiegel |
| 6,205,115 | B1 | 3/2001 | Ikebe et al. |
| 6,219,706 | B1 | 4/2001 | Fan et al. |
| 6,237,036 | B1 | 5/2001 | Ueno et al. |
| 6,259,705 | B1 | 7/2001 | Takahashi et al. |
| 6,304,975 | B1 | 10/2001 | Shipley |
| 6,321,338 | B1 | 11/2001 | Porras et al. |
| 6,324,286 | B1 | 11/2001 | Lai et al. |
| 6,374,300 | B2 | 4/2002 | Masters |
| 6,449,651 | B1 | 9/2002 | Dorfman et al. |
| 6,459,682 | B1 | 10/2002 | Ellesson et al. |
| 6,519,703 | B1 | 2/2003 | Joyce |
| 6,587,866 | B1 | 7/2003 | Modi et al. |
| 6,594,780 | B1 | 7/2003 | Shen et al. |
| 6,715,081 | B1 | 3/2004 | Attwood et al. |
| 6,732,279 | B2 | 5/2004 | Hoffman |
| 6,735,702 | B1 | 5/2004 | Yavatkar et al. |
| 6,748,414 | B1 | 6/2004 | Bournas |
| 6,754,832 | B1 | 6/2004 | Godwin et al. |
| 6,757,822 | B1 | 6/2004 | Feiertag et al. |
| 6,772,334 | B1 | 8/2004 | Glawitsch |
| 6,779,017 | B1 | 8/2004 | Lamberton et al. |
| 6,779,033 | B1 | 8/2004 | Watson et al. |
| 6,779,117 | B1 | 8/2004 | Wells |
| 6,952,728 | B1 | 10/2005 | Alles et al. |
| 6,988,106 | B2 | 1/2006 | Enderwick et al. |
| 7,010,605 | B1 | 3/2006 | Dharmarajan |
| 7,013,482 | B1 | 3/2006 | Krumel |
| 7,058,718 | B2 | 6/2006 | Fontes et al. |
| 7,069,438 | B2 | 6/2006 | Balabine et al. |
| 7,076,555 | B1 | 7/2006 | Orman et al. |
| 7,143,087 | B2 | 11/2006 | Fairweather |
| 7,159,237 | B2 | 1/2007 | Schneier et al. |
| 7,167,927 | B2 | 1/2007 | Philbrick et al. |
| 7,181,524 | B1 | 2/2007 | Lele |
| 7,194,766 | B2 | 3/2007 | Noehring et al. |
| 7,218,722 | B1 | 5/2007 | Turner et al. |
| 7,222,366 | B2 | 5/2007 | Bruton, III et al. |
| 7,228,359 | B1 | 6/2007 | Monteiro |
| 7,234,161 | B1 | 6/2007 | Maufer et al. |
| 7,236,457 | B2 | 6/2007 | Joe |
| 7,254,133 | B2 | 8/2007 | Govindarajan et al. |
| 7,269,850 | B2 | 9/2007 | Govindarajan et al. |
| 7,277,963 | B2 | 10/2007 | Dolson et al. |
| 7,301,899 | B2 | 11/2007 | Goldstone |
| 7,308,499 | B2 | 12/2007 | Chavez |
| 7,310,686 | B2 | 12/2007 | Uysal |
| 7,328,267 | B1 | 2/2008 | Bashyam et al. |
| 7,334,232 | B2 | 2/2008 | Jacobs et al. |
| 7,337,241 | B2 | 2/2008 | Boucher et al. |
| 7,343,399 | B2 | 3/2008 | Hayball et al. |
| 7,349,970 | B2 | 3/2008 | Clement et al. |
| 7,370,353 | B2 | 5/2008 | Yang |
| 7,391,725 | B2 | 6/2008 | Huitema et al. |
| 7,392,241 | B2 | 6/2008 | Lin et al. |
| 7,398,317 | B2 | 7/2008 | Chen et al. |
| 7,418,733 | B2 | 8/2008 | Connary et al. |
| 7,423,977 | B1 | 9/2008 | Joshi |
| 7,430,755 | B1 | 9/2008 | Hughes et al. |
| 7,463,648 | B1 | 12/2008 | Eppstein et al. |
| 7,467,202 | B2 | 12/2008 | Savchuk |
| 7,472,190 | B2 | 12/2008 | Robinson |
| 7,492,766 | B2 | 2/2009 | Cabeca et al. |
| 7,506,360 | B1 | 3/2009 | Wilkinson et al. |
| 7,509,369 | B1 | 3/2009 | Tormasov |
| 7,512,980 | B2 | 3/2009 | Copeland et al. |
| 7,533,409 | B2 | 5/2009 | Keane et al. |
| 7,543,052 | B1 | 6/2009 | Cesa Klein |
| 7,552,323 | B2 | 6/2009 | Shay |
| 7,565,549 | B2 | 7/2009 | Satterlee et al. |
| 7,577,833 | B2 | 8/2009 | Lai |
| 7,584,262 | B1 | 9/2009 | Wang et al. |
| 7,584,301 | B1 | 9/2009 | Joshi |
| 7,590,736 | B2 | 9/2009 | Hydrie et al. |
| 7,613,193 | B2 | 11/2009 | Swami et al. |
| 7,613,822 | B2 | 11/2009 | Joy et al. |
| 7,640,591 | B1 | 12/2009 | Tripathi et al. |
| 7,653,633 | B2 | 1/2010 | Villella et al. |
| 7,665,138 | B2 | 2/2010 | Song et al. |
| 7,673,072 | B2 | 3/2010 | Boucher et al. |
| 7,675,854 | B2 | 3/2010 | Chen et al. |
| 7,703,102 | B1 | 4/2010 | Eppstein et al. |
| 7,707,295 | B1 | 4/2010 | Szeto et al. |
| 7,711,790 | B1 | 5/2010 | Barrett et al. |
| 7,739,736 | B1 | 6/2010 | Tripathi et al. |
| 7,747,748 | B2 | 6/2010 | Allen |
| 7,765,328 | B2 | 7/2010 | Bryers et al. |
| 7,792,113 | B1 | 9/2010 | Foschiano et al. |
| 7,808,994 | B1 | 10/2010 | Vinokour et al. |
| 7,809,131 | B1 | 10/2010 | Njemanze et al. |
| 7,826,487 | B1 | 11/2010 | Mukerji et al. |
| 7,881,215 | B1 | 2/2011 | Daigle et al. |
| 7,895,649 | B1 | 2/2011 | Brook et al. |
| 7,948,952 | B2 | 5/2011 | Hurtta et al. |
| 7,970,934 | B1 | 6/2011 | Patel |
| 7,983,258 | B1 | 7/2011 | Ruben et al. |
| 7,990,847 | B1 | 8/2011 | Leroy et al. |
| 7,991,859 | B1 | 8/2011 | Miller et al. |
| 8,019,870 | B1 | 9/2011 | Eppstein et al. |
| 8,032,634 | B1 | 10/2011 | Eppstein et al. |
| 8,037,532 | B2 | 10/2011 | Haswell |
| 8,090,866 | B1 | 1/2012 | Bashyam et al. |
| 8,122,116 | B2 | 2/2012 | Matsunaga et al. |
| 8,179,809 | B1 | 5/2012 | Eppstein et al. |
| 8,185,651 | B2 | 5/2012 | Moran et al. |
| 8,191,106 | B2 | 5/2012 | Choyi et al. |
| 8,220,056 | B2 | 7/2012 | Owens, Jr. |
| 8,224,971 | B1 | 7/2012 | Miller et al. |
| 8,239,670 | B1 | 8/2012 | Kaufman et al. |
| 8,266,235 | B2 | 9/2012 | Jalan et al. |
| 8,289,981 | B1 | 10/2012 | Wei et al. |
| 8,296,434 | B1 | 10/2012 | Miller et al. |
| 8,301,802 | B2 | 10/2012 | Wei et al. |
| 8,312,507 | B2 | 11/2012 | Chen et al. |
| 8,379,515 | B1 | 2/2013 | Mukerji |
| 8,448,245 | B2 | 5/2013 | Banerjee et al. |
| 8,478,708 | B1 | 7/2013 | Larcom |
| 8,499,093 | B2 | 7/2013 | Grosser et al. |
| 8,539,075 | B2 | 9/2013 | Bali et al. |
| 8,554,929 | B1 | 10/2013 | Szeto et al. |
| 8,560,693 | B1 | 10/2013 | Wang et al. |
| 8,584,199 | B1 | 11/2013 | Chen et al. |
| 8,595,791 | B1 | 11/2013 | Chen et al. |
| 8,595,845 | B2 | 11/2013 | Basavapatna et al. |
| RE44,701 | E | 1/2014 | Chen et al. |
| 8,675,488 | B1 | 3/2014 | Sidebottom et al. |
| 8,681,610 | B1 | 3/2014 | Mukerji |
| 8,750,164 | B2 | 6/2014 | Casado et al. |
| 8,782,221 | B2 | 7/2014 | Han |
| 8,800,034 | B2 | 8/2014 | McHugh et al. |
| 8,813,180 | B1 | 8/2014 | Chen et al. |
| 8,813,228 | B2 | 8/2014 | Magee et al. |
| 8,826,372 | B1 | 9/2014 | Chen et al. |
| 8,832,832 | B1 | 9/2014 | Visbal |
| 8,879,427 | B2 | 11/2014 | Krumel |
| 8,885,463 | B1 | 11/2014 | Medved et al. |
| 8,897,154 | B2 | 11/2014 | Jalan et al. |
| 8,965,957 | B2 | 2/2015 | Barros |
| 8,977,749 | B1 | 3/2015 | Han |
| 8,990,262 | B2 | 3/2015 | Chen et al. |
| 9,094,364 | B2 | 7/2015 | Jalan et al. |
| 9,106,561 | B2 | 8/2015 | Jalan et al. |

(56) References Cited

U.S. PATENT DOCUMENTS

| | | |
|---|---|---|
| 9,154,577 B2 | 10/2015 | Jalan et al. |
| 9,154,584 B1 | 10/2015 | Han |
| 9,215,208 B2 | 12/2015 | Fraize et al. |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 2001/0042204 A1 | 11/2001 | Blaker et al. |
| 2001/0049741 A1 | 12/2001 | Skene et al. |
| 2002/0010798 A1* | 1/2002 | Ben-Shaul .......... G06F 17/3089 709/247 |
| 2002/0032777 A1 | 3/2002 | Kawata et al. |
| 2002/0078164 A1 | 6/2002 | Reinschmidt |
| 2002/0087708 A1 | 7/2002 | Low et al. |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0143991 A1 | 10/2002 | Chow et al. |
| 2002/0178259 A1 | 11/2002 | Doyle et al. |
| 2002/0188839 A1 | 12/2002 | Noehring et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023846 A1 | 1/2003 | Krishna et al. |
| 2003/0023873 A1 | 1/2003 | Ben-Itzhak |
| 2003/0028585 A1 | 2/2003 | Yeager et al. |
| 2003/0035409 A1 | 2/2003 | Wang et al. |
| 2003/0035420 A1 | 2/2003 | Niu |
| 2003/0061507 A1 | 3/2003 | Xiong et al. |
| 2003/0069973 A1 | 4/2003 | Ganesan et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0187688 A1 | 10/2003 | Fey et al. |
| 2003/0195962 A1 | 10/2003 | Kikuchi et al. |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0059943 A1 | 3/2004 | Marquet et al. |
| 2004/0059951 A1 | 3/2004 | Pinkas et al. |
| 2004/0059952 A1 | 3/2004 | Newport et al. |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0093524 A1 | 5/2004 | Sakai |
| 2004/0111516 A1 | 6/2004 | Cain |
| 2004/0111635 A1 | 6/2004 | Boivie et al. |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0143751 A1 | 7/2004 | Peikari |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0242200 A1 | 12/2004 | Maeoka et al. |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0021999 A1 | 1/2005 | Touitou et al. |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0041584 A1 | 2/2005 | Lau et al. |
| 2005/0044068 A1 | 2/2005 | Lin et al. |
| 2005/0044270 A1* | 2/2005 | Grove et al. .................. 709/238 |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0108434 A1 | 5/2005 | Witchey |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0257093 A1 | 11/2005 | Johnson et al. |
| 2005/0259586 A1 | 11/2005 | Hafid et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0056297 A1 | 3/2006 | Bryson et al. |
| 2006/0061507 A1 | 3/2006 | Mohamadi |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0143707 A1 | 6/2006 | Song et al. |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0206936 A1 | 9/2006 | Liang et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0253902 A1 | 11/2006 | Rabadan et al. |
| 2006/0256716 A1 | 11/2006 | Caci |
| 2006/0265585 A1 | 11/2006 | Lai |
| 2006/0277303 A1 | 12/2006 | Hegde et al. |
| 2006/0280121 A1 | 12/2006 | Matoba |
| 2006/0288411 A1 | 12/2006 | Garg et al. |
| 2007/0011168 A1* | 1/2007 | Keohane .......... G06F 17/30887 |
| 2007/0019543 A1 | 1/2007 | Wei et al. |
| 2007/0056038 A1 | 3/2007 | Lok |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1 | 7/2007 | O'Rourke et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0291773 A1 | 12/2007 | Khan et al. |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0183885 A1 | 7/2008 | Durrey et al. |
| 2008/0228781 A1 | 9/2008 | Chen et al. |
| 2008/0229418 A1 | 9/2008 | Chen et al. |
| 2008/0250099 A1 | 10/2008 | Shen et al. |
| 2008/0256623 A1 | 10/2008 | Worley et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |

(56) References Cited

U.S. PATENT DOCUMENTS

| | | |
|---|---|---|
| 2009/0049198 A1* | 2/2009 | Blinn et al. .................. 709/245 |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0150996 A1 | 6/2009 | Haswell |
| 2009/0164614 A1 | 6/2009 | Christian et al. |
| 2009/0168995 A1 | 7/2009 | Banga et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1* | 9/2009 | Hu ........................ H04L 12/14 455/406 |
| 2009/0228547 A1 | 9/2009 | Miyaoka et al. |
| 2009/0241190 A1 | 9/2009 | Todd et al. |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0098417 A1 | 4/2010 | Tse-Au |
| 2010/0106833 A1* | 4/2010 | Banerjee et al. ............. 709/226 |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0284300 A1 | 11/2010 | Deshpande et al. |
| 2010/0286998 A1 | 11/2010 | Picken |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0026537 A1* | 2/2011 | Kolhi .................. H04L 12/4633 370/401 |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0082947 A1 | 4/2011 | Szeto et al. |
| 2011/0093522 A1 | 4/2011 | Chen et al. |
| 2011/0093785 A1 | 4/2011 | Lee et al. |
| 2011/0099403 A1 | 4/2011 | Miyata et al. |
| 2011/0110294 A1 | 5/2011 | Valluri et al. |
| 2011/0131646 A1 | 6/2011 | Park et al. |
| 2011/0145324 A1 | 6/2011 | Reinert et al. |
| 2011/0153744 A1 | 6/2011 | Brown |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0249572 A1 | 10/2011 | Singhal et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshehandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0036272 A1 | 2/2012 | El Zur |
| 2012/0042060 A1 | 2/2012 | Jackowski et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0106355 A1 | 5/2012 | Ludwig |
| 2012/0110472 A1 | 5/2012 | Amrhein et al. |
| 2012/0117571 A1 | 5/2012 | Davis et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0163186 A1 | 6/2012 | Wei et al. |
| 2012/0170548 A1 | 7/2012 | Rajagopalan et al. |
| 2012/0173759 A1 | 7/2012 | Agarwal et al. |
| 2012/0174196 A1 | 7/2012 | Bhogavilli et al. |
| 2012/0179770 A1 | 7/2012 | Jalan et al. |
| 2012/0191839 A1 | 7/2012 | Maynard |
| 2012/0226582 A1 | 9/2012 | Hammad |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2012/0297197 A1* | 11/2012 | Yale ........................ H04L 67/34 713/179 |
| 2012/0311116 A1 | 12/2012 | Jalan et al. |
| 2013/0019025 A1 | 1/2013 | Chaturvedi et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0124713 A1 | 5/2013 | Feinberg et al. |
| 2013/0136139 A1 | 5/2013 | Zheng et al. |
| 2013/0139245 A1 | 5/2013 | Thomas |
| 2013/0148500 A1 | 6/2013 | Sonoda et al. |
| 2013/0166762 A1 | 6/2013 | Jalan et al. |
| 2013/0173795 A1* | 7/2013 | McPherson ................... 709/225 |
| 2013/0176854 A1 | 7/2013 | Chisu et al. |
| 2013/0191486 A1 | 7/2013 | Someya et al. |
| 2013/0212265 A1 | 8/2013 | Rubio Vidales et al. |
| 2013/0250765 A1 | 9/2013 | Ehsan et al. |
| 2013/0258846 A1 | 10/2013 | Damola |
| 2013/0282791 A1 | 10/2013 | Kruglick |
| 2014/0006508 A1 | 1/2014 | Goyet et al. |
| 2014/0012972 A1 | 1/2014 | Han |
| 2014/0025568 A1 | 1/2014 | Smith et al. |
| 2014/0089500 A1 | 3/2014 | Sankar et al. |
| 2014/0137190 A1 | 5/2014 | Carey et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0258465 A1 | 9/2014 | Li |
| 2014/0258536 A1 | 9/2014 | Chiong |
| 2014/0269308 A1 | 9/2014 | Oshiba |
| 2014/0269728 A1 | 9/2014 | Jalan et al. |
| 2014/0280832 A1 | 9/2014 | Oshiba |
| 2014/0283065 A1 | 9/2014 | Teddy et al. |
| 2014/0286313 A1 | 9/2014 | Fu et al. |
| 2014/0298091 A1 | 10/2014 | Carlen et al. |
| 2014/0325588 A1 | 10/2014 | Jalan et al. |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0033341 A1 | 1/2015 | Schmidtler et al. |
| 2015/0039671 A1 | 2/2015 | Jalan et al. |
| 2015/0088597 A1 | 3/2015 | Doherty et al. |

(56) References Cited

U.S. PATENT DOCUMENTS

| | | |
|---|---|---|
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312268 A1 | 10/2015 | Ray |
| 2015/0333988 A1 | 11/2015 | Jalan et al. |
| 2015/0350048 A1 | 12/2015 | Sampat et al. |
| 2015/0350379 A1 | 12/2015 | Jalan et al. |
| 2016/0014052 A1 | 1/2016 | Han |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0088074 A1 | 3/2016 | Kannan et al. |
| 2016/0105395 A1 | 4/2016 | Chen et al. |
| 2016/0105446 A1 | 4/2016 | Chen et al. |
| 2016/0119382 A1 | 4/2016 | Chen et al. |
| 2016/0156708 A1 | 6/2016 | Jalan et al. |
| 2016/0173579 A1 | 6/2016 | Jalan et al. |

FOREIGN PATENT DOCUMENTS

| | | |
|---|---|---|
| CN | 1449618 | 10/2003 |
| CN | 1473300 A | 2/2004 |
| CN | 1529460 | 9/2004 |
| CN | 1575582 | 2/2005 |
| CN | 1714545 A | 12/2005 |
| CN | 1725702 | 1/2006 |
| CN | 1910869 A | 2/2007 |
| CN | 101004740 A | 7/2007 |
| CN | 101094225 | 12/2007 |
| CN | 101163336 A | 4/2008 |
| CN | 101169785 A | 4/2008 |
| CN | 101189598 | 5/2008 |
| CN | 101193089 A | 6/2008 |
| CN | 101247349 A | 8/2008 |
| CN | 101231644 A | 9/2008 |
| CN | 101495993 A | 7/2009 |
| CN | 101878663 A | 11/2010 |
| CN | 102143075 A | 8/2011 |
| CN | 102546590 | 7/2012 |
| CN | 102571742 | 7/2012 |
| CN | 102577252 | 7/2012 |
| CN | 102918801 | 2/2013 |
| CN | 103533018 A | 1/2014 |
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 A | 7/2015 |
| CN | 102577252 B | 3/2016 |
| CN | 102918801 B | 5/2016 |
| EP | 1209876 A2 | 5/2002 |
| EP | 1770915 A1 | 4/2007 |
| EP | 1885096 A1 | 2/2008 |
| EP | 02296313 A1 | 3/2011 |
| EP | 2577910 | 4/2013 |
| EP | 2622795 | 8/2013 |
| EP | 2647174 | 10/2013 |
| EP | 2760170 | 7/2014 |
| EP | 2772026 | 9/2014 |
| EP | 2901308 A2 | 8/2015 |
| EP | 2760170 B1 | 12/2015 |
| HK | 1182560 | 11/2013 |
| HK | 1183569 A | 12/2013 |
| HK | 1183996 A | 1/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A1 | 8/2015 |
| IN | 3764CHENP2014 | 8/2015 |
| JP | H09097233 | 4/1997 |
| JP | 1999096128 | 4/1999 |
| JP | H11338836 A | 12/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2009500731 A | 1/2009 |
| JP | 2013528330 | 5/2011 |
| JP | 2014504484 A | 2/2014 |
| JP | 2014143686 | 8/2014 |
| JP | 2015507380 A | 3/2015 |
| JP | 5855663 B2 | 12/2015 |
| JP | 5906263 B | 3/2016 |
| JP | 5913609 B2 | 4/2016 |
| KR | 10-0830413 B1 | 5/2008 |
| KR | 1020130096624 | 8/2013 |
| KR | 101576585 B1 | 12/2015 |
| TW | 375721 | 12/1999 |
| TW | 477140 B | 2/2002 |
| TW | 574655 B | 2/2004 |
| TW | 576066 B | 2/2004 |
| TW | I225999 B | 1/2005 |
| TW | I252976 B | 4/2006 |
| WO | WO1998042108 A1 | 9/1998 |
| WO | 01/13228 A2 | 2/2001 |
| WO | 2001014990 | 3/2001 |
| WO | WO2001045349 | 6/2001 |
| WO | 2003103237 | 12/2003 |
| WO | WO2004084085 A1 | 9/2004 |
| WO | WO2006098033 A1 | 9/2006 |
| WO | 2008053954 | 5/2008 |
| WO | WO2008078593 A1 | 7/2008 |
| WO | 2001049770 A2 | 4/2011 |
| WO | WO2011079381 A1 | 7/2011 |
| WO | 2011149796 A2 | 12/2011 |
| WO | 2012050747 | 4/2012 |
| WO | 2012075237 A2 | 6/2012 |
| WO | WO2012083264 A2 | 6/2012 |
| WO | WO2012097015 A2 | 7/2012 |
| WO | 2013070391 A1 | 5/2013 |
| WO | 2013081952 A1 | 6/2013 |
| WO | 2013096019 A1 | 6/2013 |
| WO | 2013112492 | 8/2013 |
| WO | WO2014031046 A1 | 2/2014 |
| WO | 2014052099 | 4/2014 |
| WO | 2014088741 | 6/2014 |
| WO | 2014093829 | 6/2014 |
| WO | WO2014138483 | 9/2014 |
| WO | WO2014144837 | 9/2014 |
| WO | WO2014150617 A1 | 9/2014 |
| WO | WO2014151072 A1 | 9/2014 |
| WO | WO2014176461 A1 | 10/2014 |
| WO | WO2014179753 | 11/2014 |
| WO | WO2015153020 A1 | 10/2015 |

OTHER PUBLICATIONS

Kjaer et al. "Resource allocation and disturbance rejection in web servers using SLAs and virtualized servers", IEEE Transactions on Network and Service Management, IEEE, US, vol. 6, No. 4, Dec. 1, 2009.

Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.

Cardellini et al., "Dynamic Load Balancing on Web-server Systems", IEEE Internet Computing, vol. 3, No. 3, pp. 28-39, May-Jun. 1999.

(56) References Cited

OTHER PUBLICATIONS

Hunt et al. NetDispatcher: A TCP Connection Router, IBM Research Report RC 20853 May 19, 1997.
Gite, Vivek, "Linux Tune Network Stack (Buffers Size) to Increase Networking Performance," accessed Apr. 13, 2016 at URL: <<http://www.cyberciti.biz/faq/linux-tcp-tuning/>>, Jul. 8, 2009, 24 pages.
"tcp—TCP Protocol", Linux Programmer's Manual, accessed Apr. 13, 2016 at URL: <<https://www.freebsd.org/cgi/man.cgi?query=tcp&apropos=0&sektion=7&manpath=SuSE+Linux%2Fi386+11.0&format=asci>>, Nov. 25, 2007, 11 pages.
Koike et al., "Transport Middleware for Network-Based Control," IEICE Technical Report, Jun. 22, 2000, vol. 100, No. 53, pp. 13-18.
Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.
Abe et al., "Adaptive Split Connection Schemes in Advanced Relay Nodes," IEICE Technical Report, Feb. 22, 2010, vol. 109, No. 438, pp. 25-30.
Guo, Yuan-ni et al., "An Embedded Firewall System Design Based on Ptolemy II," Journal of System Simulation, vol. 16 No. 6, pp. 1361-1363, Jun. 2004.
Huang, Quan et al., "An Embedded Firewall Based on Network Processor," IEEE, 2nd International Conference on Embedded Software and Systems, 7 pages, Dec. 16-18, 2005.
Ihde, Michael et al., "Barbarians in the Gate: An Experimental Validation of NIC-Based Distributed Firewall Performance and Flood Tolerance," IEEE, International Conference on Dependable Systems and Networks, Jun. 25-28, 2006, 6 pages.
Susilo, W. et al., "Personal Firewall for Pocket PC 2003: Design & Implementation," IEEE 19th International Conference on Advanced Information Networking and Applications, vol. 2 pp. 661-666, Mar. 28-30, 2005.
"How to Create a Rule in Outlook 2003" CreateaRule-Outlook2003.doc 031405 mad, 3 pages.
ORACLE Corporation, "Oracle Intelligent Agent User's Guide," Release 9.2.0, Part No. A96676-01, Mar. 2002.
F5 Networks, Inc., "SOL11243: iRules containing the RULE_INIT iRule event do not re-initialize when a syntax error is corrected," f5.support.com, May 24, 2010.
Ganesan et al., "YAPPERS: a peer-to-peer lookup service over arbitrary topology," IEEE, pp. 1250-1260, Mar. 30-Apr. 3, 2003.
Annexstein et al., "Indexing Techniques for File Sharing in Scalable Peer-to-Peer Networks," IEEE, pp. 10-15, Oct. 14-16, 2002.
Ling et al., "A Content-Based Resource Location Mechanism in PeerIS," IEEE, pp. 279-288, Dec. 12-14, 2002.
Dainotti, Albert et al., "TIE: A Community-Oriented Traffic Classification Platform," May 11, 2009, Springer-Verlag, Traffic Monitoring and Analysis: Proceedings First International Workshop, TMA 2009. pp. 64-74. Retrieved from: Inspec. Accession No. 11061142.
Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from INSPEC. Accession No. 12232145.

* cited by examiner

Steps to Generate Name Records 670

Step 1: Set M 913 = Number of entries in Name Entries 665
Step 2: Set N 911 = 1
Step 3: Set Capacity 329 = Capacity 327
Step 4: Set Name Records 670 = empty
Step 5: If (N 911 > M 913) Goto Step 16
Step 6: Set Name Entry Combinations 903 = a collection of name entry combinations of N 911 name entries out of the M 913 name entries in name entries 665.
Step 7: For each Name Entry Combination 905 in Name Entry Combinations 903
Step 8:    Generate a Name Record 606 using Name 404 and Name Entry Combination 905
Step 9:    Set Size 619 = Storage Size of Name Record 606
Step 10:   If Capacity 329 < Size 619 then Goto Step 16
Step 11:   Include Name Record 606 into Name Records 670
Step 12:   Decrement Capacity 329 by Size 619
Step 13: End For
Step 14: Increment N 911 by 1
Step 15: Goto Step 5
Step 16: Store Name Records 670 into Storage 315

GENERATING SECURE NAME RECORDS

FIELD

This present invention relates generally to data communications, and more specifically, to a service gateway.

BACKGROUND

Today Internet relies on a proper operating name services over the Internet, such as Domain Name System (DNS) services and other similar name services. These name services translate a service name, or a resource name into one or more network or service addresses corresponding to servers providing the service or resource. To ensure availability of the service or resource, it is common to have many servers offering the service or resource. Such availability may address one or more service problems such as server failure, server maintenance, network delays, network traffic congestion, service scaling with expected large numbers of service sessions, service restrictions to geographical areas, secure access for private networks, or other service considerations.

When a host sends a name service request, the response it receives may contain service addresses that are not appropriate for the host or the service name requested. For example, abc.com may have different services for different geographic location. A host on the East coast should be served by a resource server on the East coast, while hosts on the West coast should be served by servers on the West coast. In another example, movies.universal-studio.com has different distribution agreements with studios over different countries. Hosts from Japan should be directed to servers that enforces Japan's services. Hosts from Belgium should be directed to servers enforcing European services.

For example, a geo-location based name service gateway is deployed between a host and a name service server. The service gateway receives a response from the name service server. The service gateway filters the response according to a set of location based rules and the host before sending the modified response to the host. Typically the service gateway stores the response and uses it to respond to another request for the same service or resource name from another host. The process allows the service gateway to use the same response for many name service requests. The process not only reduces the load onto the name service servers, but also improves the service quality the hosts receive.

However, this process does not works well with a secure name service, where the response from the name service server is encrypted and where the modified response needs to be encrypted before sending to the host. Decryption and encryption are computationally complex and consume valuable CPU cycles of the service gateway. The service quality offered by the service gateway would degrade during a busy period when a large number of name service requests are received by the service gateway over a short period of time. Busy periods are common in many networks and for many Internet services.

Therefore, there is a need for a method to generate a plurality of secure name records based on a name record response from a name service server so as to reduce the need to generate a secure modified response for each name service request.

BRIEF SUMMARY OF THE INVENTION

According to one embodiment of the present invention, a method to generate name records by a service gateway comprising a processor comprises: (a) receiving a name service request from a host, the request comprising a name; (b) obtaining a service server name record from a name service server, the service server name record comprising one or more name entries corresponding to the name; (c) generating and storing a plurality of service gateway name records using the name and the name entries; and (d) sending a service gateway name record of the plurality of service gateway name records to the host as a response to the name service request.

In one aspect of the present invention, the obtaining (b) comprises: (b1) creating a name service request using the name; (b2) sending the name service request to the name service server; and (b3) receiving a response to the name service request from the name service server, the response comprising the service server name record comprising the one or more service server name entries corresponding to the name.

In one aspect of the present invention, the method further comprises: (e) receiving a subsequent name service request comprising the name; (f) comparing the name against the stored plurality of service gateway name records; and (g) in response to determining a match with a given service gateway name record, sending the given service gateway name record as a response to the subsequent name service request.

In one aspect of the present invention, the method further comprises: (h) in response to determining there is no match with the plurality of service gateway name records, creating a name service request using the name; and (i) sending the name service request to the name service server.

In one aspect of the present invention, the generating (c) comprises: (c1) determining a number of name entry combinations as N out of the M name entries obtained from the name service server; (c2) creating a given service gateway name record using the name and a given name entry combination; and (c3) repeating the creating (c2) according to a storage capacity of the service gateway.

In one aspect of the present invention, the creating (c2) comprises: (c2i) creating the given service gateway name record using the name and the given name entry combination according to a service policy.

In one aspect of the present invention, the name entry combinations comprise an ordered number of the name entry combinations.

In one aspect of the present invention, the sending (d) comprises: (d1) determining a status of at least one server corresponding to the service gateway name record; (d2) in response to determining that the status indicates that the at least one server is available, sending the service gateway name record to the host as the response to the name service request.

In one aspect of the present invention, the sending (d) further comprises: (d3) in response to determining that the status indicates that one or more servers corresponding to the service gateway name record is unavailable, do not send the service gateway name record to the host.

System and computer program products corresponding to the above-summarized methods are also described and claimed herein.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
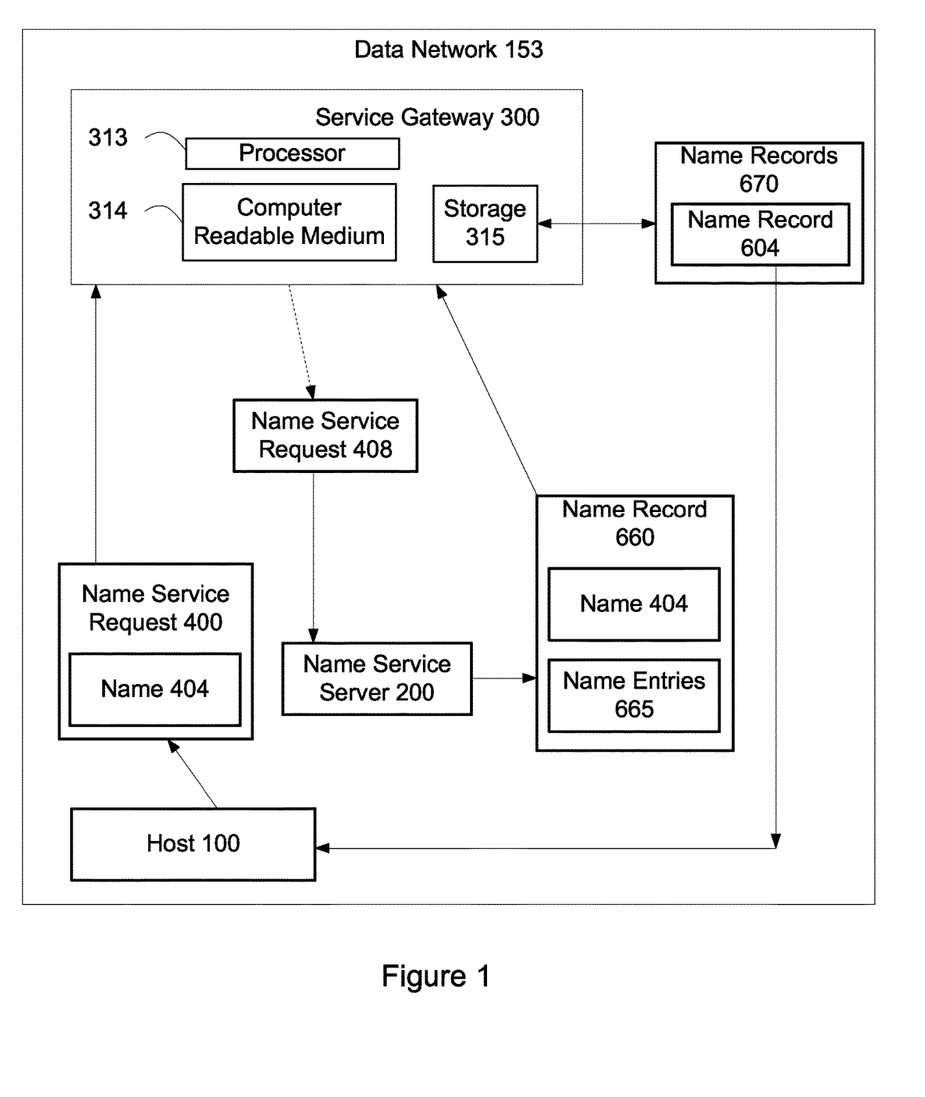
FIGS. 1 and 1a illustrate an embodiment of a service gateway servicing a name service request from a host according to the present invention.
Figure 1A:
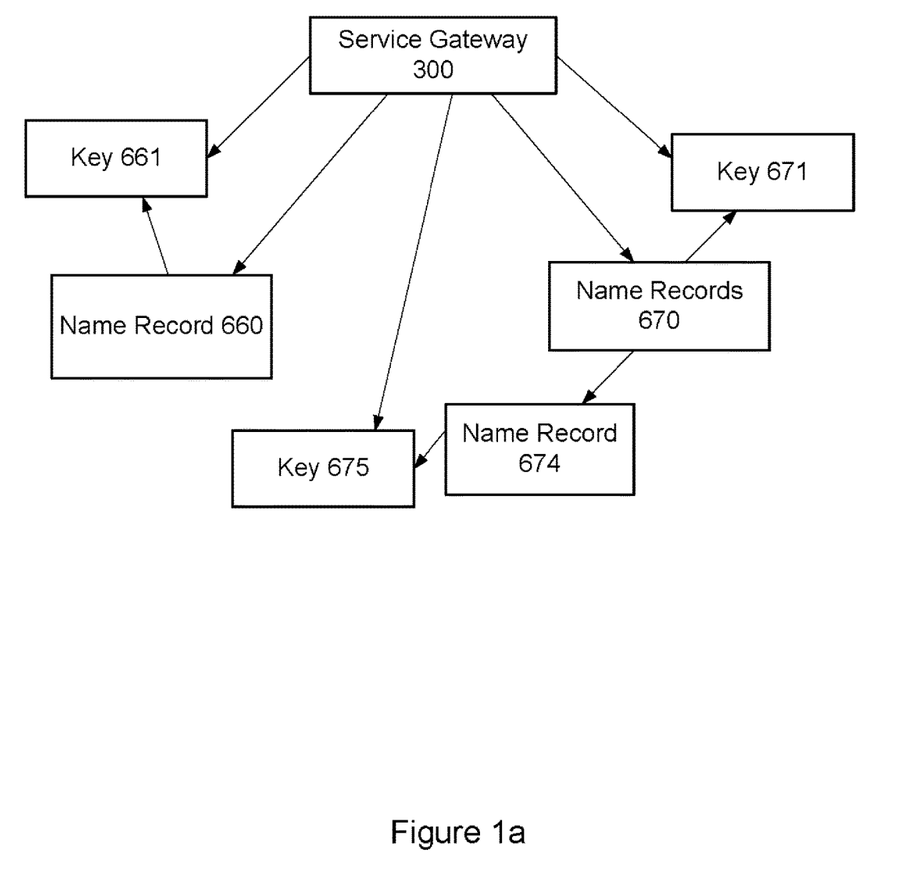

FIGS. 1 and 1a illustrate an embodiment of a name services service gateway servicing a name service request between a host and name service server according to the present invention. As illustrated in FIG. 1, host 100 sends a name service request 400 to a service gateway 300. In one embodiment, name service request 400 includes a Domain Name System (DNS) request, a request for a network address based on a name, a domain name, a machine name, a computer name, a computing device name, a service name, a resource identity or any network identity.

Host 100 is typically a computing device with network access capabilities. In one embodiment, host 100 is a workstation, a desktop personal computer or a laptop personal computer, a Personal Data Assistant (PDA), a tablet computing device, a smartphone, or a cellular phone, a set-top box, an Internet media viewer, an Internet media player, a smart sensor, a smart medical device, a net-top box, a networked television set, a networked DVR, a networked Blu-ray player, or a media center.

Service gateway 300 is a computing device operationally coupled to a processor 313 and a computer readable medium 314. The computer readable medium 314 stores computer readable program code, which when executed by the processor 313, implements the various embodiments of the present invention as described herein. In some embodiments, service gateway 300 is implemented as a server load balancer, an application delivery controller, a service delivery platform, a traffic manager, a security gateway, a component of a firewall system, a component of a virtual private network (VPN), a load balancer for video servers, a gateway for network address translation, a DNS server, a geo-location based name server, or a gateway enforcing access policies based on location information. Typically service gateway 300 includes functionality to provide name services to host 100.

Service gateway 300 receives name service request 400 and obtains a name 404 from name service request 400. In one embodiment, name 404 includes a domain name such as "www.abc.com", a computer name such as "yoda", a network device name such as "router1456", a service name such as "mail-service.anyisp.biz", a network resource name "apn.mobile-network.net" or "music-storage.private-network", or a computer name such as "john-laptop5".

In one embodiment, service gateway 300 uses name 404 to create a name service request 408, and sends the name service request 408 to a name service server 200. In response, the service gateway 300 receives a name service server name record 660 from the name service server 200, which contains one or more name entries 665 corresponding to name 404. Service gateway 300 receives name record 660 and obtains name entries 665 from name record 660.

In one embodiment, name service server 200 is a DNS server or a global service load balancer. In one embodiment, name service server 200 is a network computing device capable of processing name service request 408. In one embodiment, name service server 200 includes a software program residing in a network computing device where the software program processes name service request 408.

In one embodiment, service gateway 300 includes functionality of name service server 200. In this embodiment, the name service server 200 component of service gateway 300 processes name service request 408 and responds with name record 660. In another embodiment, the name service server 200 component of service gateway 300 does not require name service request 408 and processes name 404 to respond with name record 660.

Using name 404 and the name entries 665, service gateway 300 generates a plurality of service gateway name records 670. In one embodiment, service gateway 300 stores name records 670 in storage 315. Service gateway 300 selects a name record 604 of name records 670 and sends name record 604 to host 100 as a response to name service request 400.

In one embodiment as illustrated in FIG. 1a, name record 660 is encrypted, for example, using a public key encryption method. Service gateway 300 obtains a key 661, based on information of name record 660 and name service server 200. Service gateway 300 uses key 661 to decode name record 660 and obtains name entries 665.

In one embodiment, service gateway 300 encrypts name records 670. Service gateway 300 obtains a key 671 and uses key 671 to encrypt all the name records in name records 670. In one embodiment, for each name record 674 in name records 670, service gateway 300 obtains a separate key 675 to encrypt name record 674.

In one embodiment, service gateway 300 obtains key 661, key 671 or key 675 from a server computer in a data network. In one embodiment, service gateway 300 obtains the keys from storage 315.

In one embodiment, name records 670 include an unencrypted copy of name record 604 for use in comparison operations and an encrypted copy of name record 604. In one embodiment, service gateway 300 sends the encrypted copy of name record 604 to host 100 as a response to name service request 400.

In another embodiment in FIG. 1, service gateway 300 generates name records 670 from a prior name service request, and stores name records 670 in storage 315. In response to receiving a subsequent name service request 400, service gateway 300 obtains name 404 from name service request 400. Service gateway 300 compares the name 404 against name records in the storage 315 and determines there is a match with name records 670. Service gateway 300 selects a matching name record 604 from name records 670, and sends name record 604 to host 100 as a response to name service request 400. In this embodiment, the service gateway 300 avoids creating a name service request to be sent to the name service server 200.

In one embodiment, service gateway 300 does not find a match for the name 404 in the name records in the storage 315. In response, service gateway 300 proceeds to generate name service request 408 to be sent to name service server 200.

Figure 2:
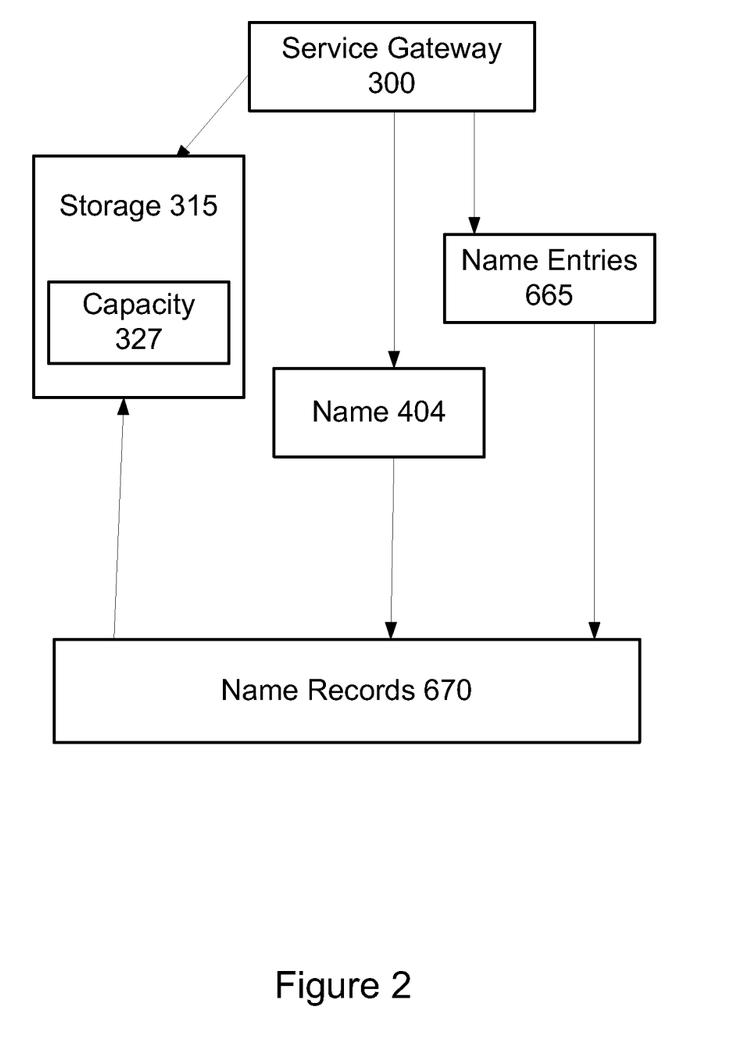
FIGS. 2 and 2a illustrate an embodiment of a process to generate a plurality of name records according to the present invention.
Figure 2A:
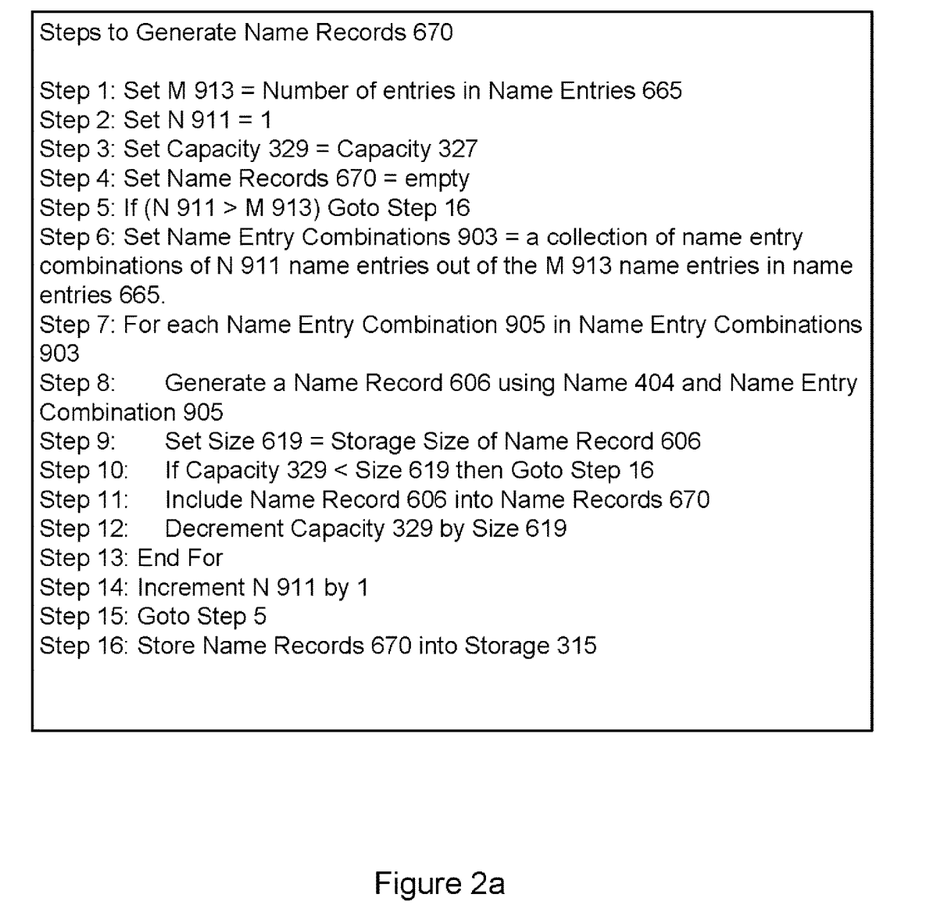

FIGS. 2 and 2a illustrate an embodiment of a process to generate service gateway name records 670 according to the present invention. As illustrated in FIG. 2, service gateway 300 generates name records 670 using name entries 665 and name 404. Service gateway 300 stores generated name records 670 in storage 315. In one embodiment, service gateway 300 limits the storage area for name records 670 within a capacity 327 of the storage 315. Service gateway 300 generates a name record using name 404 and one or more entries in name entries 665. FIG. 2a illustrates steps of a method to generate one or more name records with one or more entries in name entries 665.

Step 1: Set M 913=number of entries in Name Entries 665
Step 2: Set N 911=1
Step 3: Set Capacity 329=Capacity 327
Step 4: Set Name Records 670=empty
Step 5: If (N 911>M 913) Goto Step 16
Step 6: Set Name Entry Combinations 903=a collection of name entry combinations of N 911 name entries out of the M 913 name entries in name entries 665.
Step 7: For each Name Entry Combination 905 in Name Entry Combinations 903
Step 8: Generate a Name Record 606 using Name 404 and Name Entry Combination 905
Step 9: Set Size 619=Storage Size of Name Record 606
Step 10: If Capacity 329<Size 619 then Goto Step 16
Step 11: Include Name Record 606 into Name Records 670
Step 12: Decrement Capacity 329 by Size 619
Step 13: End For
Step 14: Increment N 911 by 1
Step 15: Goto Step 5
Step 16: Store Name Records 670 into Storage 315

In an embodiment, name entries 665 include 5 name entries {A, B, C, D, E}. In an embodiment of step 6 where N 911=1, Name Entry Combinations 903 may include {{A}, {B}, {C}, {D}, {E}}. In one embodiment of step 6 where N 911=2, Name Entry Combinations 903 may include {{A, B}, {A, C}, {A, D}, {A, E}, {B, C}, {B, D}, {B, E}, {C, D}, {C, E}, {D, E}}. In one embodiment of step 6 where N 911 is being 4, Name Entry Combinations 903 may include {{A, B, C, D}, {A, B, C, E}, {A, B, D, E}, {A, C, D, E}, {B, C, D, E}}. In one embodiment, Name Entry Combinations 903 may include {{A, B, D, E}, {A, C, D, E}, {B, C, D, E}}. In one embodiment, Name Entry Combinations 903 may not include all possible name entry combinations of N 911 entries from M 913 entries. In one embodiment, service gateway 300 creates Name Entry Combinations 903 based on a service policy such as a location-based policy, a traffic management policy or a security policy. For example, if a given Name Entry Combination is determined to violate the service policy, a name record is not created for the given Name Entry Combination.

In one embodiment, name entries 665 include a specific order for the M 913 entries. Name Entry Combinations 903 include a collection of ordered combinations of N 911 entries.

In one embodiment, N 911 in step 2 is set to M 913 and N 911 is decremented by 1 in step 14. In this embodiment, the test in step 5 is changed to "if (N 911<=0)".

Figure 3:
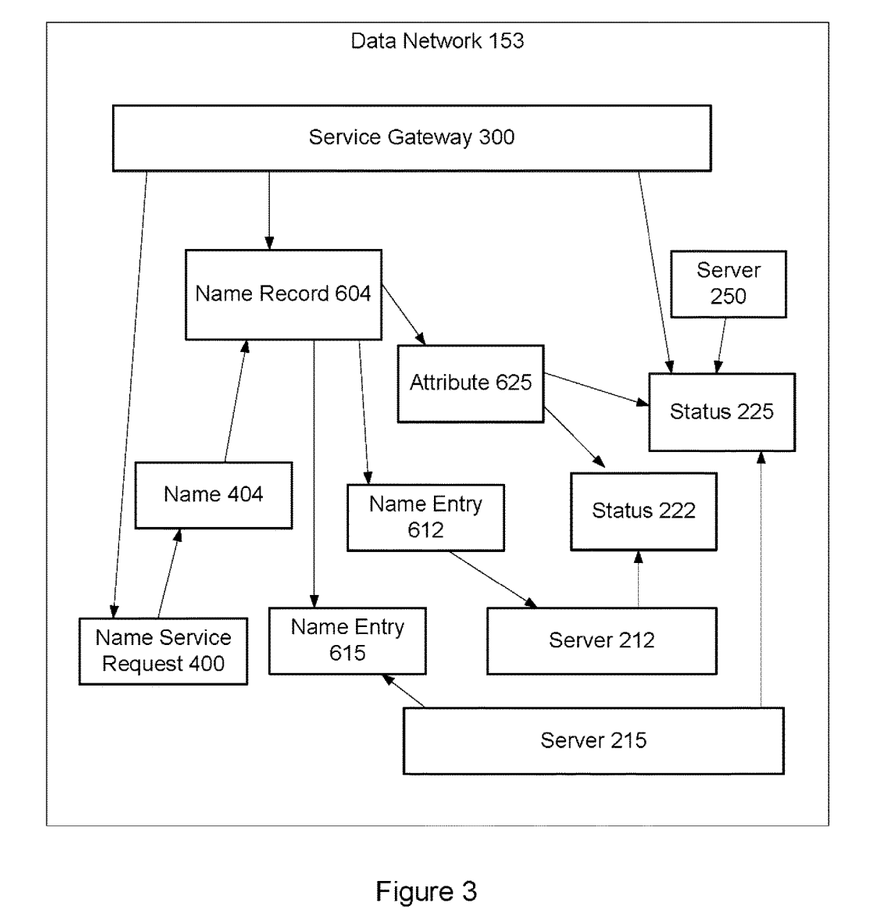
FIG. 3 illustrates an embodiment of a process to select a name record based on availability status of a server according to the present invention.

In one embodiment as illustrated in FIG. 3, service gateway 300 obtains availability status 225 for server 215. Server 215 is a network computer corresponding to name entry 615. In one embodiment, server 215 is a computing device such as a Web server, a file server, a video server, a database server, an application server, a voice system, a conferencing server, a media gateway, a SIP server, a remote access server, a VPN server, a media center, an app server or a network server providing a network or application service to host 100.

Status 225 is an indication whether server 215 is available for service. In one embodiment, server 215 is disconnected from network, busy, overload, or under maintenance, does not have necessary software or hardware component, shutdown, not running, or other undesirable condition preventing server 215 from providing services. Status 225 indicates unavailability of server 215.

In one embodiment, service gateway 300 obtains status 225 from server 215 in a communication channel or a communication session over data network 153 with server 215. In one embodiment, service gateway 300 obtains status 225 from another network computer 250 such as a network management system or a network administrative system.

In one embodiment, status 225 indicates server 215 is available. In one embodiment, server 215 resumes operation after maintenance, or after installation of a piece of software or a hardware component. In another embodiment, server 215 becomes available when the CPU load is low, or when server 215 is connected to network. In one embodiment, server 215 indicates availability status in status 225 when there is no change to availability from a previously communicated status.

In one embodiment, service gateway 300 connects to server 215 which is corresponded to a name entry 615. Name entry 615 is used in a generated name record 604. In one embodiment, name record 604 is associated with an attribute 625, which is included in service gateway 300. Service gateway 300 stores status 225 in attribute 625. Service gateway 300 checks status 225 of server 215 from time to time. In one embodiment, service gateway 300 checks periodically such as every 5 minutes, every hour, or every 10 seconds. In one embodiment, service gateway 300 receives an updated status 225 whenever there is a change to server 215. Service gateway stores updated status 225 in attribute 625.

During the processing of name 404 of name service request 400, as illustrated in FIGS. 1 and 1a, service gateway 300 determines a name in name record 604 matches name 404. Service gateway 300 further examines attribute 625 of name record 604. If attribute 625 indicates status 225 of server 215 is not available, service gateway 300 does not select name record 604 as a response to name service request 400.

In one embodiment, service gateway 300 determines status 225 in attribute 625 indicates server 215 is available. Service gateway 300 selects name record 604 as a response to name service request 400.

In one embodiment, name record 604 includes a second name entry 612 corresponding to server 212 and status 222 corresponding to server 212. In one embodiment, service gateway 300 also stores status 222 in attribute 625. Service gateway 300 examines attribute 625 for status 225 and status 222. In one embodiment, status 222 and status 225 indicate server 212 and server 215 are available respectively, service gateway 300 selects name record 604 as a response to name service request 400. In one embodiment, one of status 222 or status 225 indicates unavailability. Service gateway 300 does not select name record 604 as a response.

In one embodiment, attribute 625 includes statuses associating to servers for all name entries in name record 604. Service gateway 300 examines all the statuses for availability before selecting name record 604 as a response to name service request 400.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method to generate secure name records by a service gateway comprising a processor, the method comprising:
receiving a name service request from a host, the name service request comprising a name;
obtaining a service server name record from a name service server, the service server name record comprising a plurality of name entries corresponding to the name, wherein a first name entry of the plurality of name entries is associated with a first server and a second name entry of the plurality of name entries is associated with a second server, the first server and the second server providing a service to the host;
generating and storing a plurality of service gateway name records associated with the name, the service gateway name records each including the name and one of the plurality of name entries from the service server name record, the generating the plurality of service gateway name records being based on a determined plurality of name entry combinations from the name service server according to a service policy, the service policy consisting of a location based policy, a traffic management policy, or a security policy;
determining a violation of the location based policy, the traffic management policy, or the security policy by a name entry combination from the determined plurality of name entry combinations;
based on the determining of the violation, excluding the name entry combination from generating one of the plurality of service gateway name records for the name entry combination; and
sending a service gateway name record from the plurality of service gateway name records to the host as a response to the name service request, wherein each further service gateway name record of the plurality of service gateway name records is sent to the host in response to one of further name service requests associated with the name and received from the host, the service gateway name record and the each further service gateway name record of the plurality of service gateway name records being generated upon the receiving the name service request associated with the name and prior to receiving the further name service requests associated with the name, the each further service gateway name record including the name and a further name entry of the plurality of name entries from the service server name record.

2. The method of claim 1, wherein the obtaining comprises:
creating a name service request using the name;

sending the name service request to the name service server; and receiving a response to the name service request from the name service server, the response comprising the service server name record, the service server name record comprising the at least two service server name entries corresponding to the name.

3. The method of claim 1, further comprising:
receiving a subsequent name service request comprising the name;
comparing the name against the stored plurality of service gateway name records; and
in response to determining a match with a given service gateway name record of the stored plurality of service gateway name records, sending the given service gateway name record as a response to the subsequent name service request.

4. The method of claim 3, further comprising:
in response to determining no match with the stored plurality of service gateway name records, creating a name service request using the name; and
sending the name service request to the name service server.

5. The method of claim 1, wherein the generating further comprises:
determining the plurality of name entry combinations as N out of the M name entries obtained from the name service server;
creating a first service gateway name record using the name and at least two name entry combinations of the plurality of name entry combinations; and
creating a second service gateway name record using the name and another at least two name entry combinations of the plurality of name entry combinations, according to a storage capacity of the service gateway.

6. The method of claim 5, wherein the creating the first service gateway name record comprises:
creating the service gateway name record using the name and the at least two name entry combinations according to a service policy.

7. The method of claim 5, wherein the plurality of name entry combinations comprises an ordered number of the name entry combinations.

8. The method of claim 1, wherein the sending the service gateway name record comprises:
determining a status for each of the at least two servers corresponding to the service gateway name record; and
in response to determining that the status indicates each of the at least two servers do not have a service problem, sending the service gateway name record to the host as the response to the name service request.

9. The method of claim 8, wherein the sending further comprises:
in response to determining that the status indicates the at least two servers corresponding to the service gateway name record each have a service problem, not sending the service gateway name record to the host.

10. The method of claim 1, wherein the sending the service gateway name record comprises:
encrypting the service gateway name record; and
sending the encrypted service gateway name record to the host as the response to the name service request.

11. A non-transitory computer-readable storage medium having embodied thereon a program, the program being executable by a processor to perform a method for generating secure name records, the method comprising:

receiving a name service request from a host, the name service request comprising a name;
obtaining a service server name record from a name service server, the service server name record comprising a plurality of name entries corresponding to the name, wherein a first name entry of the plurality of name entries is associated with a first server and a second name entry of the plurality of name entries is associated with a second server, the first server and the second server providing a service to the host;
generating and storing a plurality of service gateway name records associated with the name, the service gateway name records each including the name and one of the plurality of name entries from the service server name record, the generating the plurality of service gateway name records being based on a determined plurality of name entry combinations from the name service server according to a service policy, the service policy consisting of a location based policy, a traffic management policy, or a security policy;
determining a violation of the location based policy, the traffic management policy, or the security policy by a name entry combination from the determined plurality of name entry combinations;
based on the determining of the violation, excluding the name entry combination from generating one of the plurality of service gateway name records for the name entry combination; and
sending a service gateway name record from the plurality of service gateway name records to the host as a response to the name service request, wherein each further service gateway name record of the plurality of service gateway name records is sent to the host in response to one of further name service requests associated with the name and received from the host, the service gateway name record and the each further service gateway name record of the plurality of service gateway name records being generated upon the receiving the name service request associated with the name and prior to receiving the further name service requests associated with the name, the each further service gateway name record including the name and a further name entry of the plurality of name entries from the service server name record.

12. The non-transitory computer-readable storage medium of claim 11, wherein the obtaining comprises:
creating a name service request using the name;
sending the name service request to the name service server; and
receiving a response to the name service request from the name service server, the response comprising the service server name record, the service server name record comprising the at least two service server name entries corresponding to the name.

13. The non-transitory computer-readable storage medium of claim 11 wherein the method further comprises:
receiving a subsequent name service request comprising the name;
comparing the name against the stored plurality of service gateway name records; and
in response to determining a match with a given service gateway name record of the stored plurality of service gateway name records, sending the given service gateway name record as a response to the subsequent name service request.

14. The non-transitory computer-readable storage medium of claim 13 wherein the method further comprises:

in response to determining no match with the plurality of service gateway name records, creating a name service request using the name; and sending the name service request to the name service server.

15. The non-transitory computer-readable storage medium of claim 11, wherein the generating further comprises:
   determining the plurality of name entry combinations as N out of the M name entries obtained from the name service server;
   creating a first service gateway name record using the name and at least two name entry combinations of the plurality of name entry combinations; and
   creating a second service gateway name record using the name and another at least two name entry combinations of the plurality of name entry combinations, according to a storage capacity of the service gateway.

16. The non-transitory computer-readable storage medium of claim 15, wherein the creating the first service gateway name record comprises:
   creating the service gateway name record using the name and the at least two name entry combinations according to a service policy.

17. The non-transitory computer-readable storage medium of claim 11, wherein the sending the service gateway name record comprises:
   determining a status for each of the at least two servers corresponding to the service gateway name record;
   in response to determining that the status indicates the at least two servers do not have a service problem, sending the service gateway name record to the host as the response to the name service request.

18. The non-transitory computer-readable storage medium of claim 17, wherein the sending further comprises:
   in response to determining that the status indicates that the at least two servers corresponding to the service gateway name record each have a service problem, not sending the service gateway name record to the host.

19. The non-transitory computer-readable storage medium of claim 11, wherein the sending the service gateway name record comprises:
   encrypting the service gateway name record; and
   sending the encrypted service gateway name record to the host as the response to the name service request.

20. A service gateway, comprising:
   a processor; and
   a memory communicatively coupled to the processor, the memory storing instructions executable by the processor to perform a method comprising:
   receiving a name service request from a host, the name service request comprising a name;
   obtaining a service server name record from a name service server, the service server name record comprising a plurality of name entries corresponding to the name, wherein a first name entry of the plurality of name entries is associated with a first server and a second name entry of the plurality of name entries is associated with a second server, the first server and the second server providing a service to the host;
   generating and storing a plurality of service gateway name records associated with the name, being based on a determined plurality of name entry combinations according to a service policy, using the name and the name entries from the service server name record, each of the plurality of service gateway name records including the name and the name entries from the service server name record, the service policy consisting of a location based policy, a traffic management policy, or a security policy;
   determining a violation of the location based policy, the traffic management policy, or the security policy by a name entry combination from the determined plurality of name entry combinations;
   based on the determining of the violation, excluding the name entry combination from generating one of the plurality of service gateway name records for the name entry combination; and
   sending a service gateway name record from the plurality of service gateway name records to the host as a response to the name service request, wherein each further service gateway name record of the plurality of service gateway name records is sent to the host in response to one of further name service requests associated with the name and received from the host, the service gateway name record and the each further service gateway name record of the plurality of service gateway name records being generated upon the receiving the name service request associated with the name and prior to receiving the further name service requests associated with the name, the each further service gateway name record including the name and a further name entry of the plurality of name entries from the service server name record.

21. The service gateway of claim 20, wherein the obtaining comprises:
   creating a name service request using the name;
   sending the name service request to the name service server; and
   receiving a response to the name service request from the name service server, the response comprising the service server name record, the service server name record comprising the at least two service server name entries corresponding to the name.

22. The service gateway of claim 20, wherein the method further comprises:
   receiving a subsequent name service request comprising the name;
   comparing the name against the stored plurality of service gateway name records; and
   in response to determining a match with a given service gateway name record of the stored plurality of service gateway name records, sending the given service gateway name record as a response to the subsequent name service request.

23. The service gateway of claim 22, wherein the method further comprises:
   in response to determining no match with the plurality of service gateway name records, creating a name service request using the name; and
   sending the name service request to the name service server.

24. The service gateway of claim 20, wherein the generating further comprises:
   determining the plurality of name entry combinations as N out of the M name entries obtained from the name service server;
   creating a first service gateway name record using the name and at least two name entry combinations of the plurality of name entry combinations; and
   creating a second service gateway name record using the name and another at least two name entry combinations of the plurality of name entry combinations, according to a storage capacity of the service gateway.

25. The service gateway of claim 24, wherein the creating the first service gateway name record comprises:
   creating the service gateway name record using the name and the at least two name entry combinations according to a service policy.

26. The service gateway of claim 20, wherein the sending the service gateway name record comprises:
   determining a status for each of the at least two servers corresponding to the service gateway name record;
   in response to determining that the status indicates the at least two servers do not have a service problem, sending the service gateway name record to the host as the response to the name service request.

27. The service gateway of claim 26, wherein the sending further comprises:
   in response to determining that the status indicates that the at least two servers corresponding to the service gateway name record each have a service problem, not sending the service gateway name record to the host.

28. The service gateway of claim 20, wherein the sending the service gateway name record comprises:
   encrypting the service gateway name record; and
   sending the encrypted service gateway name record to the host as the response to the name service request.

* * * * *